United States Patent Office 2,839,538
Patented June 17, 1958

2,839,538

SUBSTITUTED BUTYROLACTONES

Joseph W. Nemec, Philadelphia, Pa., assignor to Rohm & Haas, Philadelphia, Pa., a corporation of Delaware No Drawing. Application August 26, 1953
Serial No. 376,739

7 Claims. (Cl. 260—343.6)

This invention relates to a method for preparing substituted butyrolactones. It also deals with novel γ-carboxyalkyl butyrolactones.

According to this invention lactones of the formula

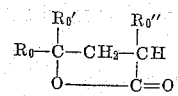

where $R_0$ and $R_0'$ are alkyl groups of not over five carbon atoms or carboxyalkyl groups when taken individually or when taken together represent a saturated alkylene chain of four to five carbon atoms which together with the adjoining carbon atom forms a carbocycle and $R_0''$ is hydrogen, a lower alkyl group, or a carboxyalkyl group, are prepared by heating together in liquid phase water, a strong acid as catalyst, and a tertiary nitro compound of the formula

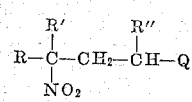

wherein R and R' are alkyl groups of not over five carbon atoms each or carboxylic substituted alkyl groups when taken individually or when taken together saturated alkylene chains of four to five carbon atoms which jointly with the adjoining carbon atom form a carbocycle, R'' is hydrogen, a lower alkyl group, or a carboxylic substituted alkyl group, and Q is a carboxylic group. It should also be noted that R'' may be chlorine or the phenyl group, as may also R or R'. The group Q will normally contain not over nine carbon atoms, but can contain more. This is also the preferred upper size for R and R' when these are carboxylic substituted alkyl groups, but, again, this is not the limiting size of these groups, since compounds having groups of even more carbon atoms are operative.

The starting nitro compound in every case contains a nitro group joined to a tertiary carbon atom, one substituent of which is a

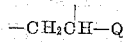

group, where Q represents a carboxylic group of some kind. This group may be the carboxyl group itself or a true functional derivative thereof, including carboxylate, i. e., a salt of the carboxylic acid, —COOM, where M represents a cation giving a soluble salt; ester, which may be represented by —COOR$^x$, where R$^x$ is an alcohol residue, particularly a lower alkyl group; amide, including the —CONH$_2$ group and N-substituted amides, —CONHR$^1$ or —CONR$^1$R$^2$, where R$^1$ and R$^2$ are usually simple hydrocarbon groups, such as methyl, ethyl, or butyl, or R$^1$ and R$^2$ together form a divalent chain forming a heterocycle with the nitrogen, as in morpholides, pyrrolidides, or piperidides; acid halide, particularly —COCl; anhydride; and nitrile. These are all carboxylic functions since they pertain to the carboxyl group or are directly convertible thereto. It may be noted that any form of the carboxylic groups of the nitro compound appears in the final butyrolactone as the carboxyl group.

Nitro compounds of the above formula are in general derived from primary or secondary nitroalkanes, such as nitromethane, nitroethane, 1-nitropropane, 1-nitro-n-butane, 1-nitro-n-pentane, 1-nitro-n-hexane, 1-nitro-2-methylpropane, 1-nitro-2-methylbutane, 1-nitro-3-methylbutane, 2-nitropropane, 2-nitro-n-butane, 2-nitro-n-pentane, 2-nitro-3-methylbutane, and other nitroparaffins. The nitroparaffins react by addition, particularly in the presence of a catalyst, as is known, with acrylic, α-alkylacrylic, α-chloroacrylic, α-phenylacrylic acids, salts, esters, amides, nitriles, and like carboxylic derivatives. Typical of the many disclosures of preparing the starting materials used in this invention are Bruson's United States Patents 2,342,119, 2,361,259, and 2,390,918; Buckley et al., J. Chem. Soc. 1947, 1505, and British Patent 584,086; Leonard et al., J. Amer. Chem. Soc. 71, 1758, 1760 (1949); J. Org. Chem. 17, 1262 (1952), and Kloetzel, J. Amer. Chem. Soc. 70, 3571 (1948). Where more than one hydrogen is present on the carbon carrying the nitro group, each hydrogen can be replaced with a carboxylic alkyl group, such as carbalkoxyalkyl, cyanoethyl, carboxyalkyl, or carbamidoalkyl. Such a group, after being introduced may be converted to some other carboxylic substituted alkyl group. The exact form of the carboxylic function in the nitro starting materials is not important, particularly since in the heating of compound and aqueous acid, the salt, ester, amide, halide, or anhydride forms are converted to the carboxyl group.

Typical starting materials are methyl γ-nitro-γ-methylvalerate, ethyl γ-nitro-γ-methylvalerate, or butyl γ-nitro-γ-methylvalerate (these can also be called isocaproates), methyl γ-nitro-γ-methylhexoate, ethyl γ-nitro-γ-ethylhexoate, etheyl γ-nitro-γ-methylheptoate, ethyl 4-nitro-4,5-dimethylhexoate, dimethyl or diethyl or dipropyl γ-nitro-γ-methylpimelate or γ-nitro-γ-propylpimelate or γ-nitro-γ-pentylpimelate, dimethyl γ-nitro-γ-carbomethoxyethylpimelate, diethyl γ-nitro-γ-carboethoxyethylpimelate, γ-nitro-γ-methylvaleronitrile, γ-nitro-γ - methylcapronitrile, γ-nitro-γ-ethylcapronitrile, γ-nitro-γ - methylpimelonitrile, γ-nitro-γ-ethylpimelonitrile, γ-nitro-γ-methylvaleramide, γ-nitro-γ-methylcapramide, γ-nitro-γ-ethylcapramide, γ-nitro-γ-methylpimelamide, γ-nitro-γ-ethylpimelamide, γ-nitro-γ,N-dimethylvaleramide, γ-nitro-γ,N,N-trimethylvaleramide, γ-nitro-γ-methyl-N,N-diethylvaleramide, γ-nitro-γ,N,N'-trimethylpimelamide, γ-nitro-γ-cyanoethylpimelonitrile, γ-nitro-γ-carbamylethylpimelamide, 1-nitro-1-β-cyanoethylcyclohexane, 1-nitro-1-β-cyanoethylcyclopentane, 1-nitro-1-β-cyanoethyl-3-methylcyclohexane, 1-nitro-1-β-carbethoxyethylcyclohexane, 1-nitro-1-carbamylethylcyclohexane, carboxylic acids and their salts from the above compounds and acyl derivatives thereof. The acids, esters, amides, and nitriles are of chief interest.

As acids for catalyzing the reaction of this invention there may be used any of the strong acids in aqueous solution, particularly aqueous strong mineral acid solutions, acid concentrations from 5% to 50% being effective. There may thus be used hydrochloric or hydrobromic acids or solutions or sulfuric, arylsulfonics, such as toluenesulfonic, alkanesulfonics, such as the mixed methane to butanesulfonic acids of commerce, phosphoric acid, polyphosphoric acids, or nitric acid. The amount of acid used may be varied from about one tenth mole to 20 moles per mole of tertiary nitro compound, depending in part upon the particular type of starting material. The amount of water used will meet at least theoretical requirements. It is preferred that aqueous acid in two to three fold excess be used.

The mixture of tertiary nitro compound, water, and acid is heated, conveniently under reflux. Heating may also be done with the reaction mixture under pressure. Temperatures of 60° to 150° C. are generally used. The nitro group is split out, ester groups or amide groups are hydrolyzed to the free carboxyl form as are also salts, acid, anhydride, halides, and nitriles, and the carboxylic acid cyclizes to a substituted butyrolactone. The product is defined by the structural formula

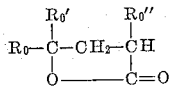

It may be noted that instead of the —CH$_2$— group there may be present a —CH(CH$_3$)— group, compounds of this type being obtainable from compounds formed from nitroalkanes and crotonates. When R$_0$ and R$_0'$ are carboxyalkyl groups, it is preferred that they contain not over four carbon atoms each.

The substituted butyrolactones may be separated by distilling off water and a volatile acid, by extracting the reaction mixture or distilling it, or by other conventional procedure for isolating such compounds.

The substituted butyrolactones are useful in various fields. They are useful in perfumery and can be used as masking odors in many kinds of compositions. They are particularly valuable as chemical intermediates, reacting with alcohols to form esters, with ammonia, amines, and other bases, halogen acids, etc. The esters thus formed are useful as softeners and plasticizers for polymeric materials, such as polyvinyl chloride. Some of the substituted butyrolactones exhibit insecticidal action.

Additional details of preparation are given in the following illustrative examples, wherein parts are by weight.

Example 1

A mixture of 587 parts of ethyl γ-nitroisocaproate and 600 parts of concentrated hydrochloric acid was heated under reflux for 24 hours. During this time some distillate was removed and about 425 parts of concentrated hydrochloric acid were added to offset this. About 250 parts of benzene was added and water was taken off azeotropically. The residue was distilled. At 52°–55° C./0.4 mm. a fraction of 265 parts was collected, consisting of γ,γ-dimethyl butyrolactone, having a refractive index, $n_D^{25}$, of 1.4324. The yield was 74%.

Substitution of the propyl ester for the above ethyl ester led to the formation of γ,γ-dimethyl butyrolactone in almost the same yield.

Example 2

A mixture of 44 parts of γ-nitroisocaproic acid and 120 parts of concentrated hydrochloric acid was heated under reflux for 24 hours. About 80 parts of benzene was added and water was removed by azeotropic distillation. A main fraction was taken at 55°–58° C./0.7 mm., amounting to 27 parts and corresponding in composition to γ,γ-dimethyl butyrolactone. This was a yield of 85%.

Example 3

A mixture of 472.5 parts of ethyl γ-nitroisocaproate, 250 parts of water, and 100 parts of 98% sulfuric acid was heated under reflux for 26 hours. During the first five hours 350 parts by volume were taken off and were replaced with 350 parts of water. The reaction mixture was allowed to separate into layers. The oil layer was taken and distilled. At 53°–58° C./0.5 mm. a fraction of 77 parts was obtained which corresponded in composition to γ,γ-dimethyl butyrolactone.

Repetition of the above procedure with substitution of an equal weight of commercial phosphoric acid for the sulfuric acid leads to the identical product.

Example 4

A mixture of 142 parts of γ-methyl-γ-nitrovaleronitrile and 240 parts of concentrated hydrochloric acid was heated under reflux for 16 hours. Almost immediately after refluxing started solid material began to separate. This was ammonium chloride. As refluxing was continued, this material went into solution. About 160 parts of benzene was added and the mixture was heated with azeotropic removal of water. Distillation of the residue gave 70 parts of γ,γ-dimethyl butyrolactone, coming over at 57°–60° C./0.8 mm.

In the same way 160 parts of γ-methyl-γ-nitrovaleramide substituted for the above nitrile yields 75 parts of γ,γ-dimethyl butyrolactone. Other carboxylic starting materials may be used in the same way.

Example 5

A mixture of 945 parts of methyl α-methyl-γ-nitroisocaproate and 1675 parts of concentrated hydrochloric acid was heated under reflux for 72 hours. The reaction mixture was cooled. A solid separated and was removed by filtering. It was washed and dried to give 387 parts of a product which corresponded in composition to α,γ,γ-trimethyl butyrolactone. It melted at 49°–50° C. The yield was 61%. This compound has the structure

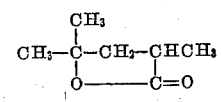

The above methyl α-methyl-γ-nitroisocaproate may be replaced with other alkyl esters than the methyl used above or with other alkyl α-alkyl-γ-nitroisocaproates, particularly those where either of the alkyl groups have not over four carbon atoms, the so-called lower alkyl groups.

Example 6

A mixture of 364 parts of 1-nitro-1-β-cyanoethylcyclohexane and 600 parts of concentrated hydrochloric acid was heated under reflux for 100 hours. The reaction mixture was treated with 400 parts of benzene and water was removed by azeotropic distillation. The reaction mixture was filtered. The filtrate was fractionally distilled. At 93°–97° C./0.3 mm. a fraction of 168 parts was collected. It had a refractive index, $n_D^{25}$, of 1.4805 and an ester value of 365 and corresponded in composition to γ,γ-pentamethylene butyrolactone, which gives a theoretical ester value of 364.

In the same way other nitrocycloalkanes can be used to give γ,γ-polymethylene butyrolactones, in particular the cyclopentyl analogue with the same reaction occurring.

An emulsifiable concentrate was made from γ,γ-pentamethylene butyrolactone, an organic solvent, and a non-ionic emulsifier. This compound was applied in aqueous sprays at 1:800 to plants infested with red spiders. A kill of 58% was obtained in 24 hours. At a dilution of 1:400 this compound gave a 67% kill of rice weevils.

Example 7

A mixture of 295 parts of technical 1,1-di-β-cyanoethyl nitroethane and 480 parts of concentrated hydrochloric acid was heated under reflux for 150 hours. About 250 parts of benzene was added to the reaction mixture. Water was taken off azeotropically. The resulting mixture was filtered. The filtrate was distilled to give a fraction amounting to 190 parts and consisting of γ-methyl-γ-(β-carboxyethyl)butyrolactone, distilling at 178°–183° C./0.2–0.4 mm. It had a refractive index of 1.4743 at 25° C. and gave an ester value of 321 (theory 326). The formula of this compound is

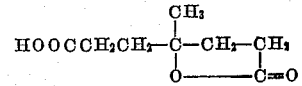

Example 8

A mixture of 550 parts of diethyl γ-methyl-γ-nitropimelate and 500 parts of concentrated hydrochloric acid was heated under reflux for 140 hours. During the first part of this period distillate amounting to 500 parts by volume was removed and 600 parts of hydrochloric acid was added in several portions so as to maintain a constant volume. The reaction mixture was treated with 170 parts of benzene and water was taken off azeotropically. Benzene was taken off under reduced pressure to give 316 parts of product, which corresponded in composition to γ-methyl-γ-(β-carboxyethyl)butyrolactone. It had a refractive index of 1.4743 at 25° C. and gave an ester number of 322.

There were mixed 138 parts of γ-methyl-γ-(β-carboxyethyl)butyrolactone, 80 parts of benzene, 104 parts of n-octyl alcohol, and 0.1 part of p-toluenesulfonic acid. This mixture was heated under reflux with trapping of distillate and removal of 12.5 parts of water. The mixture was cooled, washed with water, and distilled. At 161°–165° C./0.2 mm. a fraction of 190 parts was taken. It had a refractive index at 25° C. of 1.4578 and corresponded in composition to the octyl ester of γ-methyl-γ-(β-carboxyethyl)butyrolactone.

This ester was found to be a plasticizer for polyvinyl chloride and similar thermoplastic polymers.

*Example 9*

A mixture of 440 parts of tris(β-cyanoethyl)nitromethane and 1900 parts of concentrated hydrochloric acid was heated under reflux for 170 hours to give a mixture of ammonium chloride and lactone which was dried under reduced pressure. The resulting solid was extracted with acetonitrile. The extract was stripped of solvent under reduced pressure. The resulting residue was dissolved in the minimum amount of hot water. The resulting solution was cooled and the solid formed was removed by filtering to give 405 parts of γ,γ-di(β-carboxyethyl)butyrolactone. It had a melting point of 56°–58° C. and as obtained gave an ester value of 252 (theory 244).

The above procedure was followed with tris(carbomethoxyethyl)nitromethane, except that heating under reflux was discontinued after 72 hours. The reaction product was then a mixture of the tribasic acid, $$NO_2.C(CH_2CH_2COOH)_3$$

and the bis(β-carboxyethyl)butyrolactone. These were separated by fractional crystallization from water, the acid being much less soluble than the lactone. The melting point of the acid is 183°–185° C., while the lactone melts at 56°–58° C.

The same procedure applied to bis(2-carbomethoxypropyl)nitroethane, the mixture with hydrochloric acid being heated for 150 hours, leads to a product corresponding in composition to

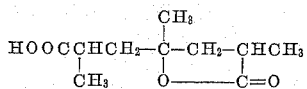

A mixture of 46 parts of γ,γ-di(β-carboxyethyl)butyrolactone, 80 parts of n-butyl alcohol, and 0.2 part of toluene-sulfonic acid was heated under reflux with azeotropic removal of water with the aid of a trap. In four hours 7.3 parts of water were collected. The mixture was cooled and washed with water. The organic layer was separated and distilled. At 202°–207° C./0.1–0.2 mm. a fraction of 43 parts was collected. It had a refractive index, $n_D^{25}$, of 1.4635 and gave an ester number of 485, corresponding in composition to the di-n-butyl ester of γ,γ-di(β-carboxyethyl)butyrolactone.

This compound was found to act as a plasticizer for such plastics as polyvinyl chloride and nitrocellulose.

*Example 10*

A mixture of 914 parts of tris(carbethoxyethyl)nitromethane and 600 parts of aqueous 35% hydrochloric acid was heated under reflux for 10 days. The reaction mixture was concentrated and cooled to give 552 parts of crude γ,γ-di(carboxyethyl)butyrolactone.

*Example 11*

A mixture of 145 parts of 2-methyl-2-nitro-4,7-dicarbomethoxyoctane (obtaining by reacting together 2-nitropropane and dimethyl α-methyl-α′-methyleneadipate under the influence of an alkaline catalyst) and 250 parts of concentrated hydrochloric acid was heated under reflux for four days. The reaction mixture was cooled. An oil and a solid separated. The solid was recrystallized several times from water to a crystalline product melting at 118°–119° C. and corresponding in composition to α-(3-carboxybutyl)-γ,γ-dimethyl butyrolactone

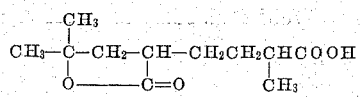

I claim:

1. A process for preparing substituted butyrolactones which comprises reacting by heating together for 24 to 240 hours in liquid phase and continuing reacting until the nitro group is split out and cyclizing occurs water, a strong acid as catalyst, and a tertiary nitro compound of the formula

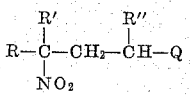

wherein R and R′ are members of the class consisting of alkyl groups of not over five carbon atoms and carboxylic substituted alkyl groups when taken individually and when taken together saturated alkylene chains of four to five carbon atoms forming a carbocycle with the adjoining carbon atom, R″ is a member of the class consisting of hydrogen, lower alkyl groups, and carbalkoxyalkyl groups, and Q is a carboxylic group.

2. A process for preparing substituted butyrolactones which comprises reacting by heating together for 24 to 240 hours in liquid phase and continuing reacting until the nitro group is split out and cyclizing occurs water, a strong acid as catalyst, and a tertiary nitro compound of the structure

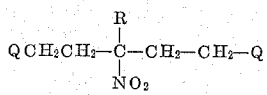

wherein R is an alkyl group of not over five carbon atoms, and Q is a carboxylic group.

3. A process for preparing γ-methyl-γ-carboxyethyl butyrolactone which comprises reacting by heating together for 24 to 240 hours in liquid phase and continuing reacting until the nitro group is split out and cyclizing occurs water, a strong acid as catalyst, and a lower alkyl ester of γ-methyl-γ-nitropimelic acid.

4. A process for preparing γ,γ-di(β-carboxyethyl)butyrolactone which comprises reacting by heating together for 24 to 240 hours in liquid phase and continuing reacting until the nitro group is split out and cyclizing occurs water, a strong acid as catalyst, and a dialkyl ester of γ-nitro-γ-carbalkoxyethylpimelic acid wherein the alkyl groups contain not over four carbon atoms each.

5. A process for preparing γ-alkyl-γ-carboxyethyl butyrolactones which comprises reacting by heating together for 24 to 240 hours in liquid phase and continuing reacting until the nitro group is split out and cyclizing occurs water, a strong acid as catalyst, and a tertiary nitro compound of the formula

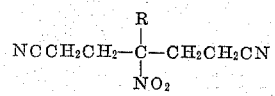

wherein R is an alkyl group of not over five carbon atoms.

6. A process for preparing γ-methyl-γ-carboxyethyl butyrolactone which comprises reacting by heating together for 24 to 240 hours in liquid phase and continuing reacting until the nitro group is split out and cyclizing occurs water, a strong acid catalyst, and γ-methyl-γ-nitropimelonitrile.

7. A process for preparing γ,γ-dicarboxyethyl butyrolactone which comprises reacting by heating together for 24 to 240 hours in liquid phase and continuing reacting until the nitro group is split out and cyclizing occurs water, a strong acid, and γ-nitro-γ-cyanoethylpimelonitrile.

References Cited in the file of this patent

UNITED STATES PATENTS 404,150   Wulff et al. _____ Apr. 20, 1943

OTHER REFERENCES

Beilstein: Hand. der. Org. Chem., vol. 18, 1st. Supp., p. 479 (1934).

Beilstein: Hand. der. Org. Chem., vol. 18, 1st. Supp., p. 481 (1934).

Beilstein: Hand. der. Org. Chem., vol. 18, p. 485 (1934).

Leuchs et al.: Ber. 55, p. 3951 (1922).

Burwell: Annalen 304, p. 279 (1899).